Figure 1:
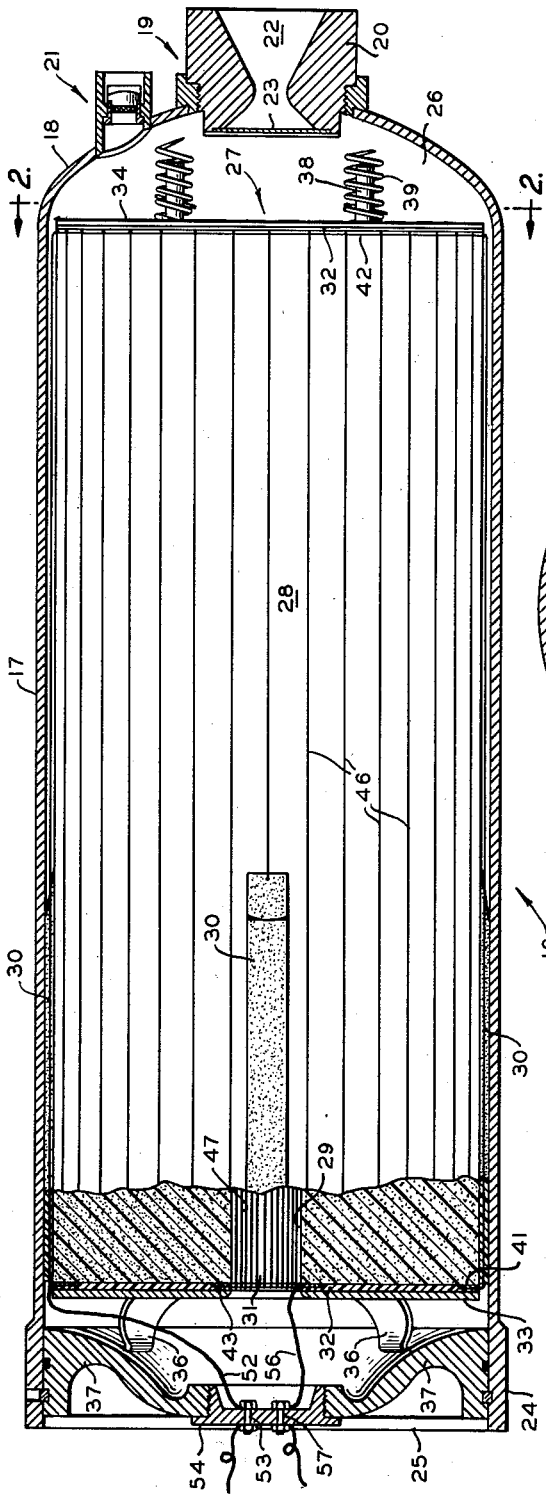

Sept. 5, 1961 R. J. BRAZIL ET AL 2,998,704
IGNITION OF SOLID ROCKET PROPELLANTS
Filed Aug. 13, 1956 4 Sheets-Sheet 1

INVENTORS
T. L. BLOSCHE
R. J. BRAZIL
BY Hudson & Young
ATTORNEYS

Sept. 5, 1961  R. J. BRAZIL ET AL  2,998,704
IGNITION OF SOLID ROCKET PROPELLANTS
Filed Aug. 13, 1956  4 Sheets-Sheet 2

*INVENTORS*
T. L. BLOSCHE
R. J. BRAZIL
BY Hudson & Young
ATTORNEYS

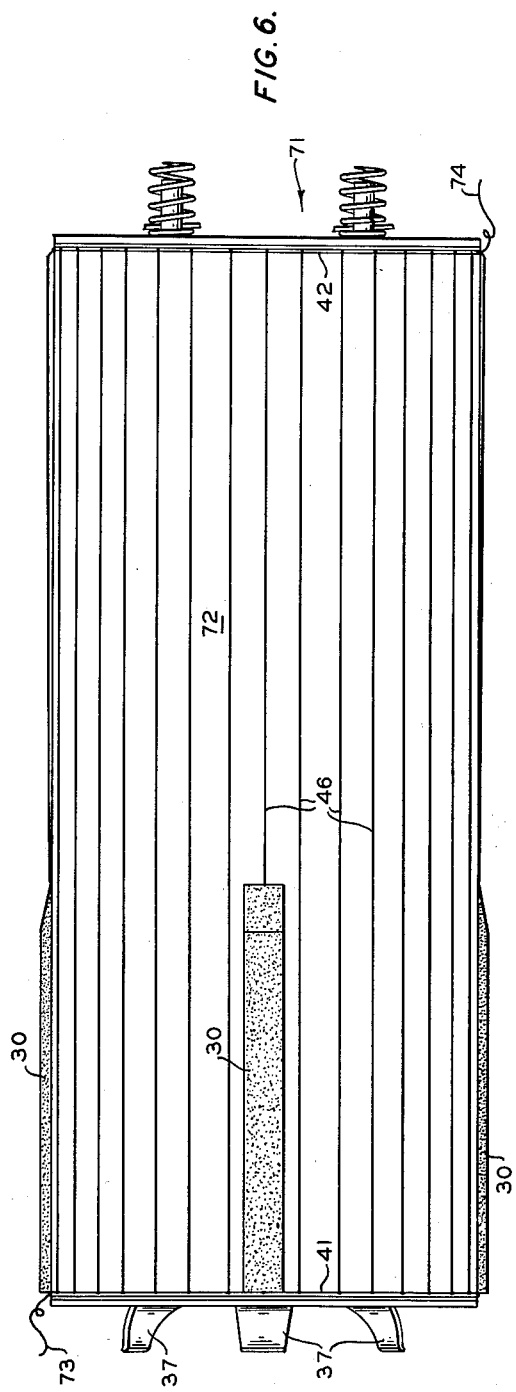
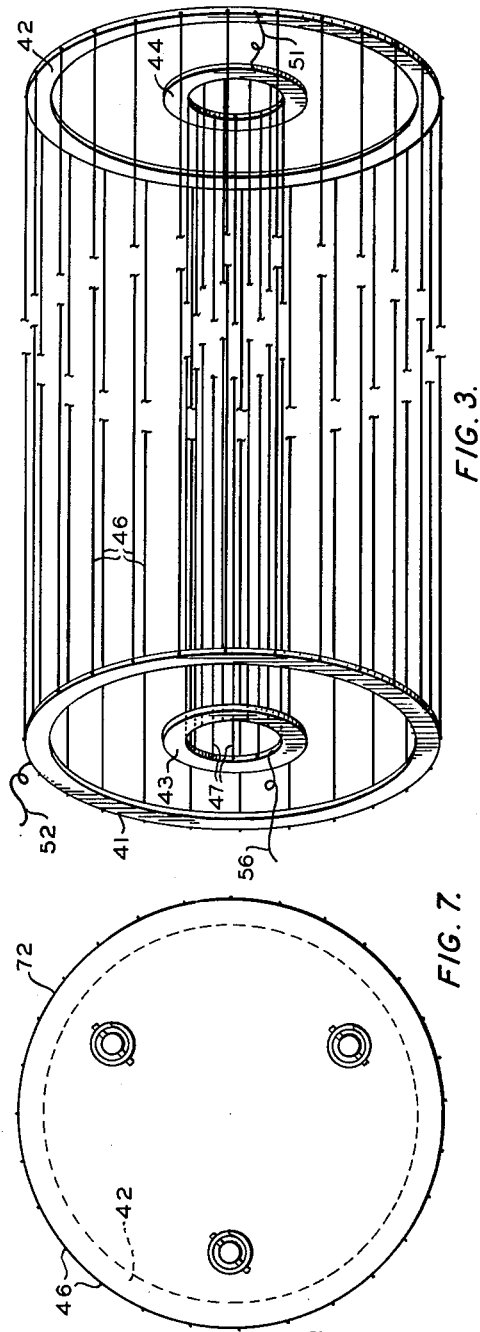

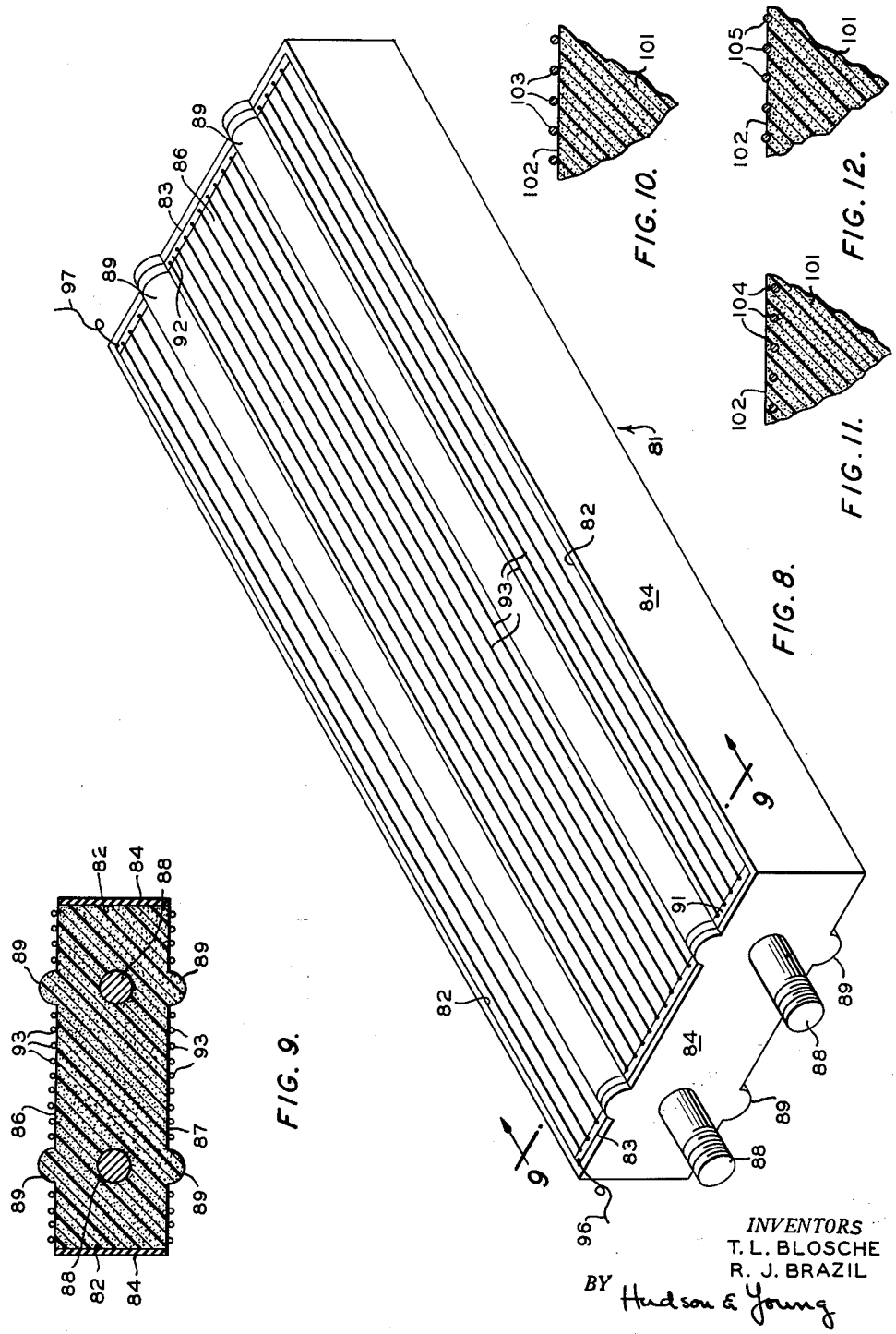

United States Patent Office 2,998,704
Patented Sept. 5, 1961

2,998,704
IGNITION OF SOLID ROCKET PROPELLANTS
Robert J. Brazil and Thomas L. Blasche, Jr., McGregor, Tex., assignors to Phillips Petroleum Company, a corporation of Delaware
Filed Aug. 13, 1956, Ser. No. 603,759
6 Claims. (Cl. 60—35.6)

This invention relates to the ignition of solid rocket propellants. In one aspect, it relates to an electrical ignition device for igniting solid rocket propellants used in rocket motors commonly employed for assisting the take-off of aircraft. In a further aspect, it relates to a rocket motor containing a solid propellant and having a novel electrical ignition device for initiating combustion of said propellant.

Solid propellants utilized in rockets, such as JATO units, comprise a fuel and an oxidant for oxidizing the fuel. Ammonium nitrate and ammonium perchlorate are often utilized as the oxidant while the fuel component is usually a hydrocarbon material which acts as a binder for bonding the particles into a solid grain as well as acting as a fuel. Binder-fuel materials include asphalt, rubber and other tacky hydrocarbon-containing materials.

Recently it has been discovered that superior solid propellant mixtures are obtained comprising a major proportion of a solid oxidant such as ammonium nitrate or ammonium perchlorate and a minor proportion of a rubbery binder material such as a copolymer of a conjugated diene and a vinylpyridine or other substituted heterocyclic nitrogen base compound, which after incorporation is cured by a quaternization reaction or a vulcanization reaction. Solid propellant mixtures of this nature and a process for their production are disclosed and claimed in copending application Serial No. 284,447, filed April 25, 1952, by W. B. Reynolds and J. E. Pritchard.

These solid propellant mixtures, especially where the solid oxidant employed is ammonium nitrate, are inherently difficult to ignite. Ammonium nitrate-binder propellants having a relatively high auto-ignition temperature (about 600° F.). These propellants are highly susceptible to changes in pressure and a pressure of about 200 p.s.i. is usually necessary to sustain combustion. The specific heats of these propellants are high but their heat transfer coefficients are low. Thus, in order to maintain a steady combustion of these propellants, it is necessary to provide sufficient heat to maintain a hot zone (e.g., approximately ⅛ inch thick) below the burning surface.

Powdered igniter charges heretofore employed for initiating the combustion of these propellants have been found wanting in certain respects. These igniter charges are often characterized by an explosive-type combustion and the shock thus produced may cause some disintegration of the solid propellant. The ignition products produced are often scattered at random in the combustion chamber and as a result all points of burning surface of the propellant are not simultaneously ignited. Where these igniter charges are employed to initiate the combustion of internal-external burning propellants, the ignition products tend to be directed through the perforation and the outer or external burning surfaces are non-uniformly ignited. Moreover, these powdered igniter charges are often subject to impact shock and static electricity. The combustion of propellants ignited by these charges, as a result, is non-uniform, with the result that the operation of the rocket motor is often hazardous and a non-uniform thrust is often developed.

Accordingly, an object of this invention is to provide a novel electrical igniter device for solid rocket propellants. Another object is to provide a rocket motor charged with a solid rocket propellant, the combustion of which is initiated by a novel electrical igniter device. Another object is to provide a novel electrical igniter device which will instantaneously and uniformly ignite all of the burning surface of a solid rocket propellant. A further object is to provide a novel electrical igniter device which is positive in action, simple, dependable, safe, easily fabricated and which can be readily installed in rocket motors. Other objects, advantages and features of our invention will become obvious, to those skilled in the art, from the following discussion, accompanying drawing and appended claims.

Broadly contemplated, our invention comprises a novel electrical igniter device having at least one electrically conducting wire orientated in close proximity to substantially all of the burning surface of a solid rocket propellant. Upon applying an electrical current to this wire, all of the burning surface of the propellant, rather than only a limited portion thereof, is simultaneously, instantaneously and uniformly ignited. A rocket motor charged with a solid propellant ignited by our novel electrical igniter device produces a uniform thrusts and maintains a desired projectory.

Figure 2:
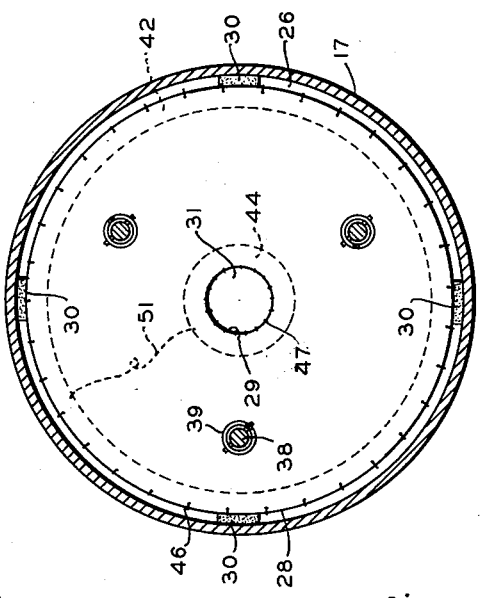
Figure 4:
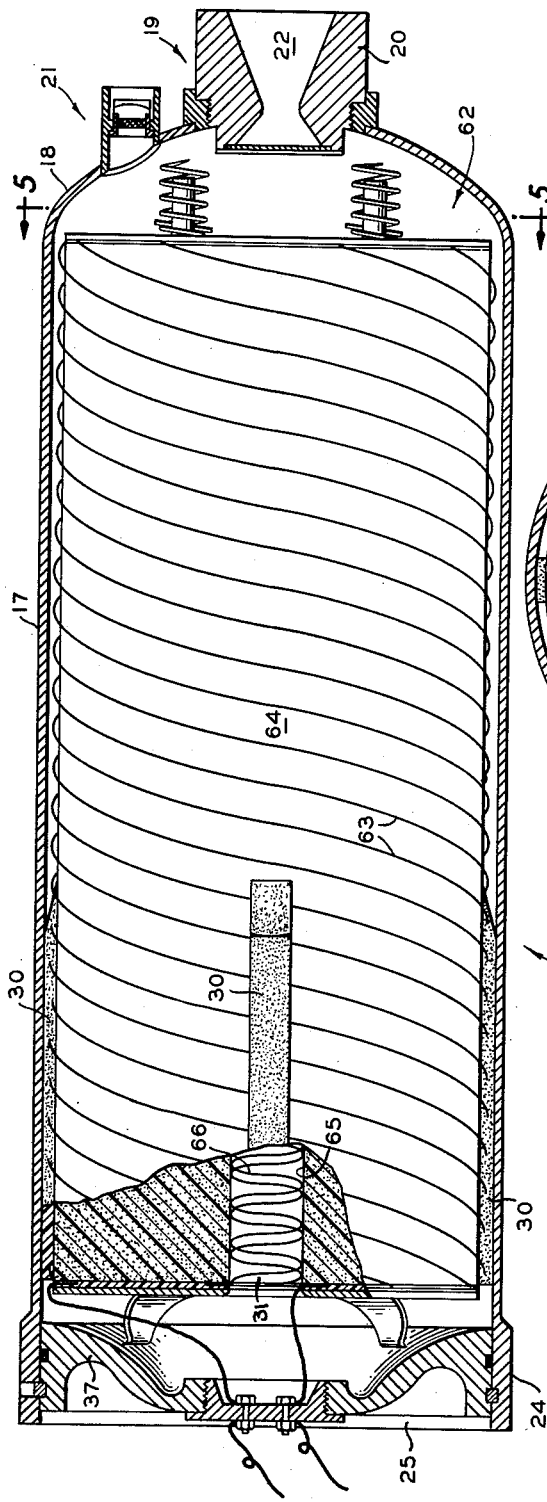
Figure 5:
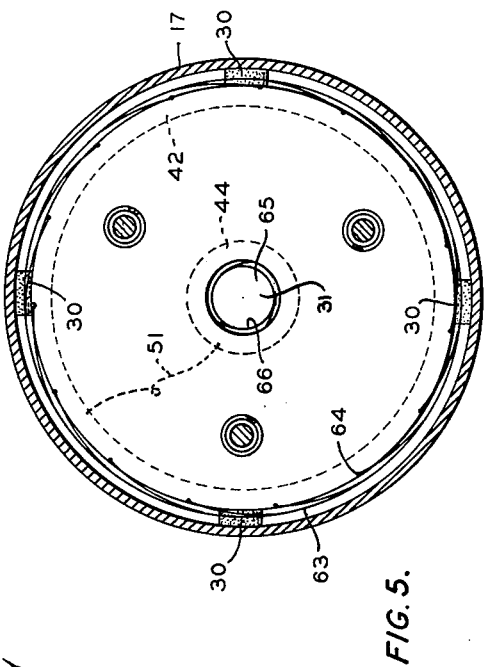

Referring to the accompanying drawings,
FIGURE 1 is an elevational, section view of a rocket motor charged with an internal-external burning solid propellant illustrating one embodiment of our invention;
FIGURE 2 is an elevational, cross-sectional view of FIGURE 1 taken along the plane indicated;
FIGURE 3 is an isomeric view of the electrical igniter device shown in FIGURE 1;
FIGURE 4 is an elevational, section view of a rocket motor similar to that of FIGURE 1 illustrating a second embodiment of our novel electrical igniter device;
FIGURE 5 is an elevational, cross-sectional view of FIGURE 4 taken along the plane indicated;
FIGURE 6 is an elevational view of an external burning solid propellant, ready for insertion in a rocket motor, such as shown in FIGURE 1, provided with the electrical igniter device of our invention;
FIGURE 7 is an elevational end view of FIGURE 6 taken along the plane indicated;
FIGURE 8 is an isomeric view of a double-web propellant grain provided with another embodiment of our novel igniter device;
FIGURE 9 is an elevational, cross-section view of FIGURE 8 taken along the plane indicated; and,
FIGURES 10, 11, and 12 are cross-sectional views of portions of a solid rocket propellant illustrating the various positions which the electrically conducting wires occupy with respect to the burning surface of the propellant.

Referring now to the drawing, wherein like characters refer to similar parts, and to FIGURE 1 in particular, a rocket motor generally designated 16 is shown and represents one form of a jet propulsion motor which may be employed, for example, to assist the take-off of an aircraft. Rocket motor 16 has a cylindrical casing 17 having a reduced rear or aft portion 18 which defines an axial opening in which a nozzle device generally designated 19 is provided. Nozzle 19 is provided with internal restrictions 20 so as to define a Venturi-like passage 22 for the passage of combustion gases. A rupture disk 23 is provided across the inside mouth of the passage 22. The reduced casing portion 18 has a safety plug attachment 21 therein capable of releasing excessive pressure from the rocket motor, as is well known to those skilled in the art. The other or head end of the casing 17 is in the form of an enlarged portion 24 and this end of the casing is closed by means of a closure member 25.

The casing 17 thus defines a combustion chamber 26 in which is loaded a solid rocket propellant generally designated 27. This particular propellant 27 is cylindrical in shape and has an outer diameter smaller than the inner diameter of the casing 17. The propellant 27 is of the internal-external burning type by reason of its exposed or unrestricted outer surface 28 and its inner exposed surface 29 which is defined by an axial perforation 31 extending the length of the propellant 27. A plurality of resilient retaining pads or strips 30, made of sponge rubber for example, are placed between the head portion of the external burning surface 28 and the adjacent head portion of the casing 17. The ends of the propellant 27 are restricted by means of a layer of restricting material 32 which has a central opening in alignment with perforation 31. Retaining plates 33 and 34 having similar openings cover the outside of the restricting material 32. Secured to the head retaining plate 33 are outer-extending prongs or legs 36 which are adapted to register with a propellant retaining assembly 37. The aft retaining plate 34 has secured to its outer surface a plurality of prongs 38 surrounded by compression spring 39 which are adapted to come into contact with the reduced portion 18 of casing 17.

A description of our novel igniter device will now be set forth. Thin, outer conductor rings or bus bars 41 and 42 are in contact on their inner surface with the ends of propellant 27 adjacent its outer periphery and with the restrictor material 32 at their outer surface. Thin, inner conductor rings or bus bars 43 and 44 are similarly placed with respect to the ends of the propellant 27 and are in proximity to the periphery of axial perforation 31. A plurality of outer conducting wires 46 are spatially strung between the two outer conductor rings 41 and 42 (which serve as electrical collecting points) and are suitably secured at their respective ends to the outer peripheries thereof. These outer conducting wires 46 are electrically connected in parallel and are in close proximity to the external burning surface 28 of propellant 27. Outer conducting wires 46 are strung in longitudinal alignment with propellant 27.

A second pulrality of wires designated inner conducting wires 47 are spatially strung between the two inner conductor rings 43 and 44 (which also serve as electrical collecting points) and are suitably secured at their respective ends to the inner peripheries of rings 43, 44. These inner conducting wires 47 are also electrically connected in parallel and are in close proximity to the internal burning surface 29 of propellant 27. These inner conducting wires 47 are also strung in longitudinal alignment with the propellant 27. A wire 51, as shown more clearly in FIGURE 2, electrically connects the aft outer conductor ring 42 with the aft inner conductor ring 44. A lead wire 52 is connected to the outer periphery of the head outer conductor ring 41 at one end and is electrically connected to a suitably insulated bolt or similar feed-thru bushing 53 in the cap 54 at the head of the rocket motor 1 at the other end. A second lead wire 56 is secured at one end to the inner periphery of the head inner conductor ring 43 and is secured at the other end to an insulated bolt 57 in cap 54. Suitable electrical wires are secured to these bolts 53 and 57 and lead to an external power source, such as a battery (not shown). The above described electrical igniter device is more clearly understood by reference to FIGURE 3. In place of the lead wires 52 and 56, and insulated bolts 53 and 57, any other suitable electrical connection between the conductor rings and the power source can be employed, such as an insulated cable or the like.

Referring now to the second embodiment of our invention as shown in FIGURES 4 and 5, a rocket motor generally designated 61 is shown charged with a propellant 62 having an external and internal burning surface, 64, 65 respectively, similar to that propellant 27 shown in FIGURE 1. The outer conducting wires 63 are spatially wound in a helical manner in close proximity to the external burning surface 64 of propellant 62. Except for this manner of winding the wires 63, the outer burning surface 64 is ignited in a manner similar to that of FIGURE 1. A single string of inner conducting wire 66 is wound in a helical manner inside of the perforation 31 and in close proximity to the internal burning surface 65 of propellant 62. Except for this manner of winding the inner wire 66, the internal burning surface 65 is ignited in a manner similar to that of FIGURE 1. It is evident, of course, that a plurality of inner wires could be employed rather than the single inner wire 66 shown in the drawing.

FIGURES 6 and 7 show an external burning propellant 71, the external burning surface 72 of which is in close proximity to a plurality of outer conducting wires 46 in a manner similar to that described in FIGURE 1. This embodiment of our electrical igniter device is provided with only a single pair of outer conductor rings 41, 42, having electrical lead wires 73 and 74 respectively secured thereto, which lead wires 73 and 74 lead to a power source external the rocket motor in which propellant 71 is to be loaded. Propellant 71 is shown in FIGURE 6 in condition for insertion into the rear of a rocket motor similar to that shown in FIGURE 1.

It is also within the scope of our invention to ignite an external burning grain, such as shown in FIGURE 6, by providing such a propellant with a plurality of helically wound conducting wires such as shown in FIGURE 4 and for sake of brevity, we have not illustrated such a propellant since the manner of positioning such an electrical system is evident from FIGURE 4.

It is also within the scope of our invention to ignite an internal burning propellant by providing an internal electrical igniting system in which a plurality of wires are in proximity with the internal burning surface in a manner similar to that shown in either FIGURES 1 or 4.

Referring now to FIGURES 8 and 9, a solid rocket propellant grain is shown which is similar in some respects to that disclosed and claimed in the United States application of B. R. Adelman, Serial No. 453,772, filed September 2, 1954, now U. S. Patent 2,939,396. The rocket grain generally designated 81 has a rectangular parallelepiped configuration with its sides 82 and its ends 83 covered by burning restrictor material 84 while its upper surface 86 and lower surface 87 are exposed or unrestricted to permit burning of the propellant material. Rocket grain 81 is shown provided with longitudinal internal support members or rods 88 (preferably made of metal) which protrude from the ends 83 thereof. The upper and lower burning surfaces 86 and 87 are provided with ribs 89 which are likewise unrestricted and form part of said upper and lower burning surfaces 86 and 87. The total surface area of ribs 89 is equal to or slightly greater than the surface area of the perforation in the propellant material of rocket grain 81 provided for support members 88. (When other means of support are used, the ribs 89 can be omitted.) This type of rocket grain, because of its two external burning surfaces, is commonly known in the art as a double-web type grain. Conductor plates 91 and 92 are in contact with the ends 83 of the grain at their inside surface and in contact with the restrictor material 84 on their outside surface. These conductor plates 91 and 92 are preferably of the same configuration as the ends 83 of the grain 81. A plurality of spatially arranged conducting wires 93 are longitudinally strung in close proximity to the upper and lower burning surfaces 86, 87 between the conductor plates 91, 92 and are suitably secured at their respective ends to the top and bottom edges thereof. These conducting wires 93 are electrically connected in parallel. Suitable lead wires 96 and 97 are secured at one end to conductor plates 91 and 92, respectively, and lead to a power source external to the rocket motor in which grain 81 is loaded. The manner of spatially arranging the conducting wires 93 is clearly shown in FIGURE 9.

The different positions which the conducting wires of our novel electrical igniter device can be arranged with respect to the burning surface of the propellant desired to be ignited is shown in FIGURES 10, 11, and 12. In FIGURE 10, a cross section of a portion 101 of a propellant grain is shown with an exposed burning surface 102. A plurality of conducting wires 103 are shown similarly in cross section. These wires 103 are spatially arranged with respect to one another and though they are in close proximity to the burning surface 102, they are out of actual contact therewith and are positioned a small distance away from the burning surface 102.

FIGURE 11 shows a plurality of conducting wires 104 in close proximity to the burning surface 102 of the propellant 101. These wires are embedded in the propellant 101 and are positioned a small distance from the burning surface 102.

FIGURE 12 shows a plurality of conducting wires 105 which are likewise in close proximity to the burning surface 102 of the propellant 101. These wires 105 are partially embedded in the propellant 101 and partially exposed.

It should be understood that we do not intend to limit the positions of the conducting wires to that shown in FIGURES 10, 11, and 12, but have merely described these positions as preferred embodiments of our invention. It will be apparent, to those skilled in the art, that the conducting wires may be positioned in other manners (or in a combination of those positions shown in the drawing) while still retaining a close proximity to the burning surface of the propellant.

Any type of wire having a high resistance per unit volume, such as Nichrome and Chromel, for example can be employed to supply heat to the adjacent propellant burning surface. The type and size of wire employed will generally be dependent upon the available voltage, the melting point and other physical properties of the wire. The position of the wire in relation to the burning surface and the type of winding employed will be dependent upon particular configuration of the grain, the pressure-time curve desired, etc. Although we prefer to employ a plurality of electrically conducting wires, it is within the scope of our invention to employ a single wire. For example, the external burning propellant can be ignited by a single, helically wound wire. The wire or wires employed can be connected in series, parallel, or a combination of both. One skilled in the art will be readily able to determine which design parameters to employ upon being acquainted with our invention.

In fabricating the propellant grains described above, the conducting wires can be extruded along with the propellant grain or the conducting wires can be placed in the desired positions after the grain is extruded. Upon being aquainted with our invention, those skilled in the art will readily be able to determine the desired method of fabricating the propellant grains. Another particular advantage of our invention is that the propellant grains can be fitted with our electrical igniter device and stored in this condition without danger; that is, the propellant grains can be "armed" with our electrical igniter device prior to the time that the propellant grain is inserted or loaded into the rocket motor.

The layer of burning restricting material can be made from any of the slow-burning materials used for this purpose in the rocket art, such as cellulose acetate, ethyl cellulose, butadiene-methylvinylpyridine copolymer, GR–S, and the like.

Upon applying sufficient voltage to the lead wires of our novel electrical igniting device, the conducting wires become hot and all of the propellant burning surface in proximity therewith will be simultaneously and uniformly ignited. This type of ignition results in a uniform combustion of the propellant with a resulting constant and controlled thrust developed by the rocket motor.

The following are specific examples of different embodiments of our invention.

EXAMPLE I

For an internal-external burning cylindrical grain and an electrical igniter system similar to that shown in FIGURE 1, the following specifications can be employed.

Table I

| | |
|---|---|
| Wire type | Nichrome. |
| Wire size | 29 gauge B&S. |
| Volts | 24. |
| Wire length | 25 in. |
| Number of wires: | |
| External surface | 30. |
| Internal surface | 10. |
| Total resistance | 0.275 ohm. |
| Amperes | 87.3. |
| Watts | 2,095. |

EXAMPLE II

For an internal-external burning cylindrical grain having an electrical igniting system similar to that shown in FIGURE 4, the following specifications can be employed.

Table II

| | |
|---|---|
| Wire position | Helical wrapped, 6 wires on external surface; 1 wire on internal surface. |
| Wire length | 175 in. |
| Wire type | Nichrome. |
| Wire size | 29 gauge B & S. |
| Voltage of system | 220. |
| Total resistance of system | 11.0. |
| Amperes | 20.0. |
| Space between turns: | |
| External surface | 0.712 in. |
| Internal surface | 0.862 in. |

Various modifications of our invention will be apparent, to those skilled in the art, upon becoming acquainted with our invention, which modifications can be employed without departing from the scope and spirit of our invention. It is to be understood that the discussion, drawing, and examples herein have been set forth for illustrative purposes only and do not unduly limit our invention.

We claim:

1. An electrical igniting device for a solid propellant grain wherein it is desired to simultaneously, instantaneously, and uniformly ignite all of the burning surface of the solid propellant grain, said grain having an external burning surface and restricted ends, said device comprising a heating means, a pair of bus bar means adjacent either of said grain ends and adjacent said external burning surface, said bus bar means being connected to the terminals of said heating means, and means for supplying electrical current to said bus bar means, said heating means comprising a plurality of electrically conducting exposed heating elements disposed substantially uniformly over the entirety of said burning surface and contiguous thereto, whereby upon the application of electrical energy to said heating means said plurality of electrically conducting exposed heating elements are heated and the combustion of the entire burning surface is thus simultaneously, instantaneously, and uniformly initiated.

2. A device according to claim 1 wherein said plurality of electrically conducting exposed heating elements are longitudinally spaced from one another.

3. A device according to claim 1 wherein said plurality of electrically conducting exposed heating elements are helically spaced from one another.

4. An electrical igniting device for a cylindrical, solid propellant grain wherein it is desired to simultaneously, instantaneously, and uniformly ignite all of the burning surface of a solid propellant grain, said grain comprising an oxidant and a fuel, said grain having an external burning surface and an internal burning surface defined by an axial perforation, said grain also having restricted ends, said device comprising at least one outer, electrically conducting exposed wire oriented in close proximity to substantially all of said external burning surface, a pair of first ring-like bus bars adjacent either of said grain ends and adjacent said external burning surface, said outer wire terminating at its ends in said first pair of bus bars, at least one inner electrically conducting exposed wire oriented in close proximity to substantially all of said internal burning surface, a pair of second ring-like bus bars adjacent said grain ends and adjacent said internal burning surface, said inner wire terminating at its ends in said second pair of bus bars, an electrical connection between one of said second bus bars and one of said first bus bars, and lead wires connected between said bus bars and a power source for supplying electrical current whereby upon the application of electrical energy to said lead wires the combustion of the entire burning surface is simultaneously, instantaneously, and uniformly initiated.

5. The device according to claim 4 wherein a plurality of said outer wires are longitudinally oriented in spaced relation, and a single said inner wire is longitudinally oriented in proximity to said internal burning surface.

6. The device according to claim 4 wherein a plurality of said outer wires are helically oriented in spaced relation, and a single said inner wire is helically oriented in proximity to said internal burning surface.

References Cited in the file of this patent
UNITED STATES PATENTS

| | | |
|---|---|---|
| 571,909 | Scribner | Nov. 24, 1896 |
| 1,568,069 | Jenkins | Jan. 5, 1926 |
| 1,710,615 | Gallery | Apr. 23, 1929 |
| 2,400,242 | Malina et al. | May 14, 1946 |
| 2,464,181 | Lauritsen | Mar. 8, 1949 |
| 2,668,412 | Abramson | Feb. 9, 1954 |
| 2,771,212 | Effinger | Nov. 20, 1956 |
| 2,828,692 | Webster | Apr. 1, 1958 |
| 2,932,162 | Malick | Apr. 12, 1960 |